April 5, 1960
L. STRAUS
2,931,178
SAFETY ATTACHMENT FOR FLUID PRESSURE OPERATED BRAKE SYSTEM
Filed April 24, 1956
2 Sheets-Sheet 1
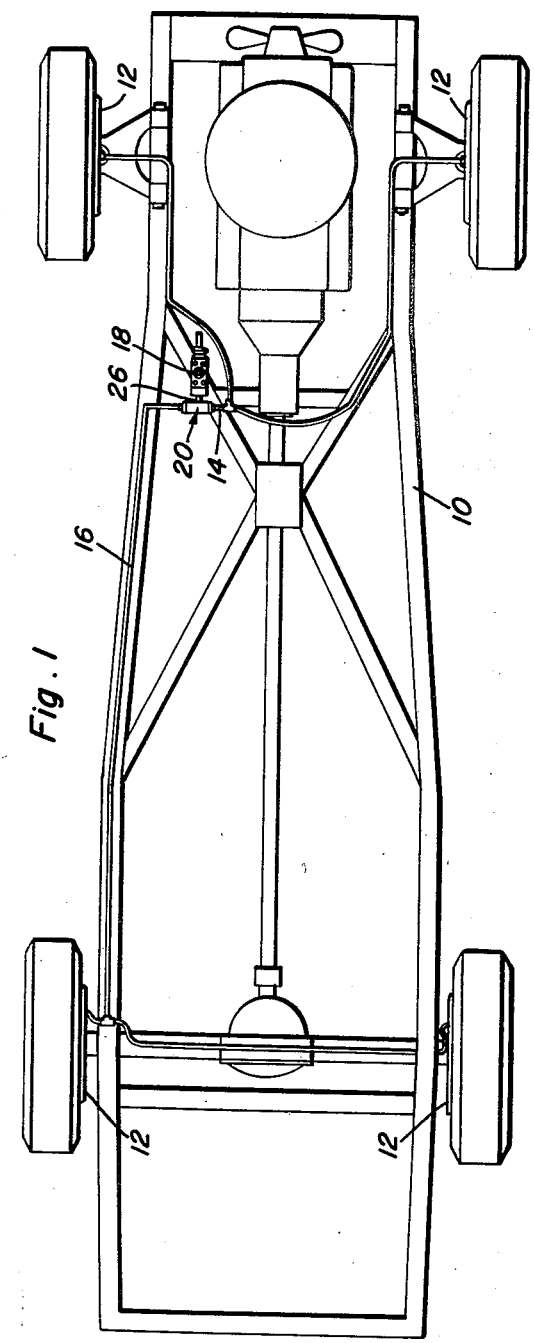
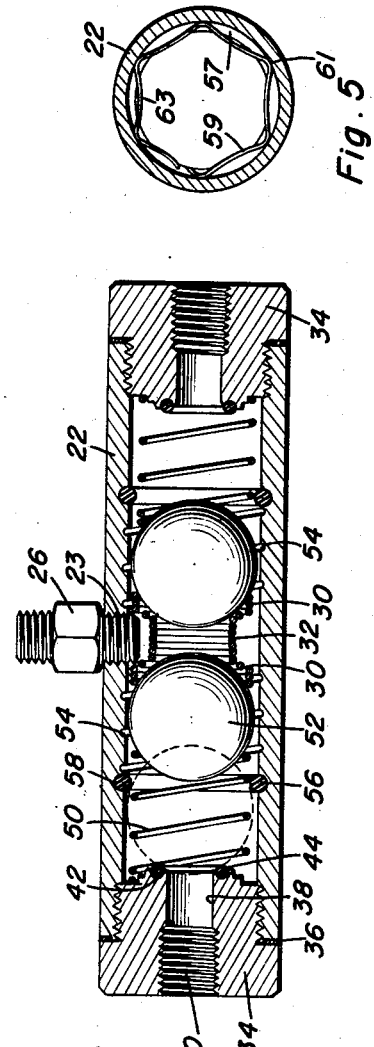
Louis Straus
INVENTOR.

April 5, 1960 L. STRAUS 2,931,178
SAFETY ATTACHMENT FOR FLUID PRESSURE OPERATED BRAKE SYSTEM
Filed April 24, 1956 2 Sheets-Sheet 2
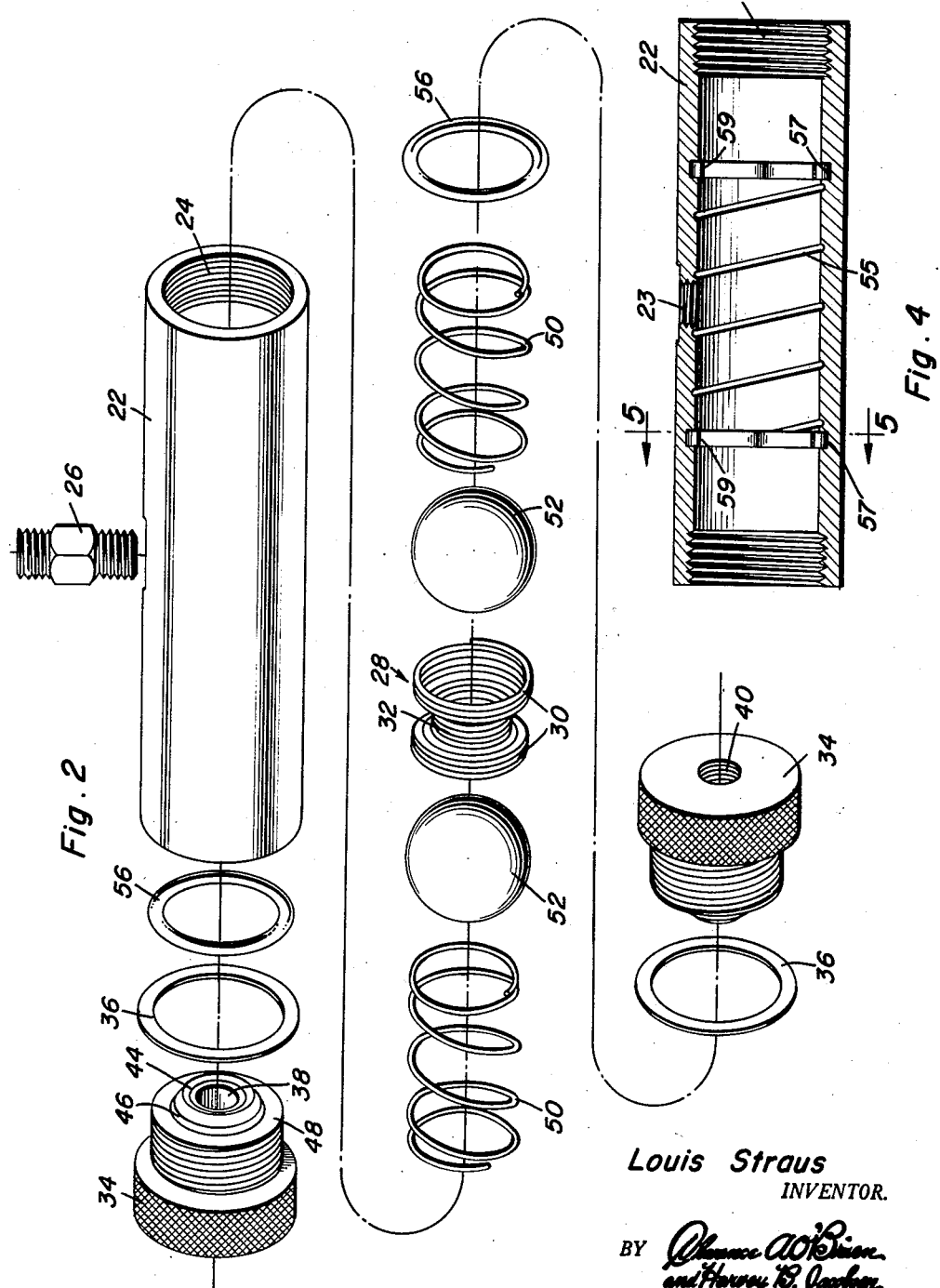
Louis Straus
INVENTOR.

United States Patent Office 2,931,178
Patented Apr. 5, 1960

2,931,178
SAFETY ATTACHMENT FOR FLUID PRESSURE OPERATED BRAKE SYSTEM

Louis Straus, Dallas, Tex., assignor, by mesne assignments, to Cole Lewis Reese, Marysville, Calif.

Application April 24, 1956, Serial No. 580,211

8 Claims. (Cl. 60—54.5)

This invention constitutes a novel and useful safety attachment for fluid pressure operated brake systems and more particularly has reference to a pulsator assembly adapted to be operatively placed between the master cylinder and the wheel cylinders of a fluid pressure operated brake system for automotive vehicles and the like.

The primary object of this invention is to provide a safety attachment which may be readily and easily applied to fluid pressure operated brake systems of the type wherein the single master cylinder imparts operation to a plurality of wheel cylinders, each of which is usually associated with a wheel brake of an automotive vehicle and the like, and whereby leakage in any of the wheel cylinders or in their supply lines connected to the safety attachment will automatically cause closing the line in which the leak develops to thereby prevent loss of fluid from the other wheel cylinders and connecting lines.

A further very important object of the invention is to provide in a safety attachment in accordance with the foregoing object a pulsator assembly having safety valves each of which is adapted to close a leaking delivery line, and to retain said line closed to thereby positively prevent any further escape of the operating pressure fluid therethrough.

A further important object of the invention is to provide a pulsator device in conformity with the foregoing objects which shall be of extremely simple, inexpensive, and long wearing construction, and yet shall be sufficiently sensitive and highly effective for the purposes intended.

A still further important object of the invention is to provide a pulsator assembly in accordance with the foregoing objects wherein during normal operation of the fluid pressure operated brake system, substantially little or no movement of the pulsator valve member shall take place, but whereby upon loss of fluid from any of the slave cylinders, or their connecting lines, the corresponding valve member shall be immediately moved to a position for closing off of the flow of fluid to that line and for retaining the valve positively in such closing position.

An additional important object of the invention is to provide a pulsator assembly in conformity with the preceding objects whereby the assembly shall be capable of fabrication from inexpensive and readily available materials, with a minimum number of constructional manufacturing operations being required.

A further specific object of the invention is to provide in a pulsator assembly in accordance with the above mentioned objects a spacer unit which shall have the plural functions of spacing and retaining the valve members in their normal inoperative position in a resilient manner; constituting a strainer means for straining the pressure fluid supplied to the pulsator assembly from the master brake cylinder; shall establish communication between pulsator chambers on opposite sides of the spacer unit; wherein the spacer unit may be easily and economically manufactured and readily placed into or removed from the casing of the pulsator unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view showing a portion of an automobile framework chassis and the manner in which the safety attachment of this invention has been incorporated in the fluid pressure operated brake system between the master cylinder and the wheel cylinders thereof;

Figure 2 is an exploded perspective view showing the various components of one preferred embodiment of the pulsator assembly constituting the subject matter of this invention;

Figure 3 is a view in vertical central longitudinal section through the form of pulsator assembly shown in Figure 2, showing in full lines the position of the valve members during normal operation of the system, and showing in dotted lines the position of one of the valve members for closing off a leak in one of the lines connecting a slave cylinder to the pulsator unit;

Figure 4 is a view in vertical central longitudinal section through a slightly modified casing of a pulsator unit and having a slightly modified retaining means for holding a valve member in closing position upon its valve seat; and Figure 5 is a vertical transverse sectional view taken substantially upon the plane indicated by the section line 5—5 of Figure 4 and showing the construction of the modified valve retainer means thereof.

The present application discloses subject matter similar to and constitutes improvements over the copending application of Reese and Strauss, Serial No. 446,810, now Patent No. 2,745,252 of May 15, 1956, for Emergency Valve Cylinder for Hydraulic Brakes and also relates to the subject matter of the application of Reese, Serial No. 422,727, now Patent No. 2,746,252 of May 22, 1956, for Safety Cylinder for Hydraulic Brakes.

In many of its features, the present invention is applicable broadly to fluid pressure operated systems whereby motion is transmitted from a master cylinder or actuator to wheel or actuated cylinders or pistons. Said systems may be either operated by hydraulic fluid under pressure, or by air under pressure, and consequently the term fluid pressure operated as used in the specification and claims is intended to refer to both types of fluid pressures. Moreover, although for more clearly illustrating the primary intended use of this invention and an example of the application of the principles thereof there has been illustrated and described herein the brake system of an automotive vehicle, it is to be understood that other fluid pressure actuated pistons may advantageously utilize some of the features of this invention.

Referring first to Figure 1 there is disclosed the chassis or framework 10 of a conventional automotive vehicle to which the principles of the present invention have been applied. This vehicle includes the usual wheel brakes 12 for each of the wheels of the vehicle, and it will be understood that each wheel brake is provided with any conventional form of wheel brake cylinder, not shown. Suitable connecting conduits 14 and 16 are provided which have operative connection with a conventional form of master cylinder 18, whereby the actuation of the latter serves through other lateral conduits to operate simultaneously the wheel cylinders. In accordance with this invention, there is interposed as a safety attachment, a pulsator assembly indicated generally by the numeral 20 and which is operatively disposed between the pressure or delivery line from the master cylinder 18 and the forward and rearward connecting conduits 14 and 16 for the wheel cylinders of the front and rear wheel brake cylinders respectively.

In accordance with this invention, it is immaterial where the safety attachment or pulsator assembly 20 is mounted, although for convenience this may be mounted in close proximity to the master cylinder, as for example upon the fire wall and within the engine compartment of the vehicle.

Referring now particularly to Figures 2 and 3 it will be seen that the pulsator assembly preferably comprises a tubular sleeve or cylinder 22 having internally threaded end portions 24, the sleeve being of a uniform smooth diameter throughout its length. Intermediate its ends, and preferably at its midportion, the sleeve 22 is provided with an internally threaded bore 23 for the reception of a nipple or fitting 26 by means of which the pulsator assembly is operatively connected to the output port of the master cylinder 18.

A novel and multipurposed spacer 28 is releasably secured at the midportion of the cylinder 22. Preferably this spacer consists of a single coil of wire having enlarged opposite ends 30 which if desired may resiliently and snugly engage the cylindrical inner surface of the body 22, and which enlarged ends are connected by a cylindrical arrangement of smaller diametered turns or convolutions to provide thus a centrally diametrically reduced or recess portion 32. By means of the penetration of the end of the fitting 26 into the interior of the body 22, as shown in Figure 3, and into the annular recess central portion 32 of the spacer, the latter is releasably and resiliently secured in the cylindrical bore or chamber of the member 22. The two screw threaded extremities 24 of the body 22 are closed by plugs 34 which are of identical construction, suitable annular washers or gaskets 36 being interposed between the shoulders of the plugs and the end of the body 22. Axial bores 38 extend through these plugs, the outer ends of these bores being internally threaded as at 40 for the reception of suitable couplings by which the conduits 14 and 16 are connected to the body 22.

Surrounding the inner termination of the bores 38 in the inner end face of each plug is an annular groove or seat 42 for the reception of a ring 44 comprising a valve seat. This ring may conveniently be of rubber or a suitable plastic or other material, and may be retained in the annular groove 42 as by swaging the outer surface of the same partially over the ring.

As will be readily apparent, the inner ends of the plugs between the valve seats 44 and their screw threaded engagement with the portions 24 are provided with a projecting surface 46 which is reduced with respect to the rest of the plug, and which may terminate in an annular shoulder 48. The surface 48 serves as a seat for one end of a pair of compression springs 50, these ends of the springs thus surrounding the diametrically reduced portion 46 and the valve seat 44 of each end plug.

Each spring engages and serves to bias a valve body 52 which may conveniently take the form of a polished steel ball, into contact with the enlarged end portions 30 of the resilient spacer 28.

It will thus be seen that the springs yieldingly urge the balls or valve members 52 into contact with the resilient spacer 28, or away from the seats 44. The diameter of the balls is slightly less than that of the internal uniform diameter of the cylindrical interior of the body 22, and a predetermined clearance in the order of .001 inch is provided between the circumference of the ball and the cylindrical surface of the chamber of the pulsator unit. The balls may thus freely travel within the chamber of the pulsator unit between the resilient spacer 28 and the valve seats carried by the end plugs, under the influence of a fluid flow. There is sufficient clearance, however, to enable variations in the pressure of the fluid medium, as effected by operation of the master cylinder 18, to pass the valve members 52 without materially moving the same and thus activate the wheel cylinders. Should, however, any leakage occur in any of the wheel cylinders or their connecting conduits, the escape of fluid therefrom will result in material fluid flow from the pulsator chamber of the body 22, to the place of leakage, and this fluid flow, in view of the small clearance between the valve member and the bore of the body 22, will be sufficient to move the corresponding ball against the influence of its return spring 50 into contact with the valve seat 44, thereby positively shutting off any further flow through that port 38 and thereby preventing any further leakage of fluid from the pulsator unit to the leaky cylinder or conduit.

In order to provide the necessary clearance past the valve member 52 to enable a very slight flow of fluid past the same for normal operation of the fluid pressure system, there are provided suitable bypass channels, grooves or slots such as those shown at 54. In the arrangement shown in Figure 3, each of these bypass channels is in the form of a spiral or screw thread cut into the cylindrical wall of the bore through the body 22. This spiral bypass channel has its inlet end disposed closely adjacent and just inwardly of the closest position of the surface of the ball to the wall of the bore, while its exit end is disposed just outwardly of this position when the member 52 is against the spacer 28. By means of this arrangement, the effective clearance between the member 52 and the wall of the bore of the member 22 is increased when the valve member 52 is either against the spacer 32, being seated in the outer end convolutions 30 of the same, or when the member 52 is only slightly spaced therefrom. Consequently, during operation of the master cylinder, very little movement of the valve members 52 occurs, since there is abundant clearance between the valve member 52 and the bore when the valve member is in its inward position against the spacer. However, as soon as there is a fluid flow, as when a leak develops in one of the conduits connected to a wheel cylinder, the valve member 52 will be moved until its portion in closest proximity to the wall of the bore in the member 22 is past the exit end of the bypass channel 54, thereby reducing the effective clearance of the valve member in this bore, and enabling the fluid to thereby rapidly and with a greatly increased force urge the valve to seating engagement upon the valve seat 44. By this means the operation of the valve member is made much more sensitive to the development of a leak in one of the conduits controlled thereby.

It is preferred to provide a means whereby the valve member may be positively retained against the seat once the valve member has been urged thereto by such a leak. For this purpose a retaining lock in the form of an O ring 56 is seated in an annular groove 58 in an appropriate location in the wall of the bore in the member 22. This O ring may be of rubber, a suitable plastic or other material, but is characterized by its resiliency which will permit passing of the valve member 52 therethrough under the influence of the flow of fluid of the fluid medium resulting from a leak. However, the same is so placed that once the valve member 52 has passed through the ring, the valve will be yieldingly urged thereby against and retained against the seat 44, as will appear from the dotted lines in Figure 3.

This arrangement will positively prevent subsequent use of the master brake from causing any further loss through the leaky conduit, thereby permitting the other conduit and its associated wheel cylinders to remain in normal operation, thus permitting the vehicle, in an emergency, to travel to a service station or the like for repairs. After the leak has been repaired, a reverse flow of pressure may be applied in any desired manner to force the member 52 back to its original position, or the plug 34 may be removed for this purpose.

It should be particularly noted that in this embodiment of the invention both springs 50, both locking rings 56, both valve members 52 and the spacer 28 may all be removed by the removal of one of the end plugs 34 and the releasing of the fitting 26. Alternatively, either valve body and its associated spring and lock ring may be removed by the removal of its corresponding end plug 34, thereby facilitating the servicing or inspection of the pulsator assembly.

Although the bypass channel 54 has been illustrated in the form of a spiral thread or screw thread, it is obvious that other bypass channels may be provided for this purpose. The present arrangement, however, lends itself to economy and simplicity of fabrication in that a piece of tubing 22 may be threaded, tapped for the bore 24, and then machined or threaded to provide the bypass channels 54 and the grooves 58 upon a single machine. After these operations have been performed, the internal surface of the pulsator chamber in the member 22 may be polished by ball polishing in a very convenient manner.

Very important features of this embodiment are the resilient spacer 28 which although of extremely simple and inexpensive construction, can be quickly mounted or removed from the device; provides a resilient stop or abutment for the valve members 52; constitutes a filter or strainer to remove any foreign matter entrained in the pressure fluid supplied into the pulsator chamber from the master cylinder; and by virtue of its convolutions provides a restricted but continuous communication between the pulsator chambers on opposite sides of the spacer unit to thereby equalize pressures prevailing therein. A further important feature of the device is the positive resilient retaining of a valve member in a closed position by the lock ring 56, which resiliently opposes movement of the valve to closing position, but resiliently retains the same therein. A further very important feature of the device resides in the provision of the bypass channel arrangement which reduces wear, renders the device much more sensitive in that during normal operation of the system a barely perceptible vibration of the body 52 occurs under the varying pressure impulses; but the body, when once moved by a leak in a line, and when once passing the bypass channel 54, moves rapidly and with increased force to closing position.

It is evident that various types of lock rings can be employed, and a modified construction of the same is shown in Figures 4 and 5. In addition, in this embodiment a modified construction of the bypass channel is illustrated which may be formed of a single continuous threading or machine operation. In this embodiment, the body 22 is of the construction previously described, and the same reference numerals have been applied thereto. Moreover, as illustrated in this form the bypass channel, designated by the numeral 55 may be continuous, extending from the position of the exit ends of the two channels 54 in the embodiment of Figure 3, and thus assists the spacers between the convolutions of the spacer member 28 in establishing a restricted communication and flow between the two pulsator chambers at opposite ends of the unit. Further, in place of the annular channel 58 there is provided a channel 57 of substantially square cross-section and in which there is received a resilient polygonal shaped leaf spring member 59. The apices or corners of this member as at 61 are seated in the bottom of the channel 57, while the midportions 63 are resiliently bowed inwardly and into the bore within the body 22, as will be readily apparent from Figure 5, to thereby yieldingly oppose passage of a valve member 52. In this embodiment, all of the previously described elements except for the modified locking ring and bypass construction are employed and function in the same manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety attachment for fluid pressure operated systems of the type having an operating master cylinder unit and a plurality of operated cylinder units with a pulsator unit operatively interposed therebetween; said pulsator unit comprising a body having an elongated bore therein, opposite ends of said bore constituting separate pulsator chambers, port means in the opposite ends of said bore for connecting each pulsator chamber with an operated cylinder, a valve seat in each pulsator chamber, a valve body slidably received in each pulsator chamber cooperating with the valve seat therein and controlling the flow through the port means of the associated chamber, each valve body having a sufficiently close fit with the wall of its pulsator chamber to allow a slow rate of leakage of fluid in said bore past the same, a resilient fluid pervious spacer disposed in said bore between said valve bodies and constituting resilient abutments for the latter, said spacer comprising a generally cylindrical coil composed of a plurality of convolutions of wire, said spacer having a diametrically reduced intermediate portion, retaining means extending through said body and into engagement in said reduced portion and resiliently securing said spacer in said bore.

2. The combination of claim 1 wherein said retainer means comprises means for introducing fluid from said master cylinder unit into said spacer and from thence into said pulsator chambers.

3. The combination of claim 1 including an annular lock means in each pulsator chamber resiliently opposing movement of its valve body past the same and resiliently engaging the entire circumference of and retaining its valve body upon its valve seat when said valve body has been seated thereon by flow of fluid from its pulsator chamber.

4. The combination of claim 1 wherein the end convolutions of said spacer are of uniform diameter and constitute an abutment seat receiving therein said valve bodies and resiliently limiting movement of said valve bodies inwardly of said bore and towards each other.

5. The combination of claim 1 including fluid bypass means in each pulsator chamber increasing the effective clearance of the valve body in said bore when the valve bodies are remote from their valve seats, said by-pass means comprising channels in the walls of said pulsator chambers and having their ends terminating in spaced relation to said spacer and to a valve seat.

6. The combination of claim 1 including an annular lock means in each pulsator chamber resiliently opposing movement of its valve body past the same and resiliently engaging the entire circumference of and retaining its valve body upon its valve seat when said valve body has been seated thereon by flow of fluid from its pulsator chamber, said lock means comprising a circumferential groove in each pulsator chamber, a radially resilient ring in said groove.

7. The combination of claim 1 including fluid bypass means in each pulsator chamber increasing the effective clearance of the valve body in said bore when the valve bodies are remote from their valve seats, said by-pass means comprising channels in the walls of said pulsator chambers and having their ends terminating in spaced relation to said spacer and to a valve seat, an annular lock means in each pulsator chamber resiliently opposing movement of its valve body past the same and resiliently engaging the entire circumference of and retaining its valve body upon its valve seat when said valve body has been seated thereon by flow of fluid from its pulsator chamber, said lock means being located between said channels and said valve seats.

8. The combination of claim 1 wherein said retainer means comprises means for introducing fluid from said master cylinder unit into said spacer and from thence into said pulsator chambers, the convolutions of said coil being in sufficiently closely spaced relation to comprise a fluid filter for filtering fluid passing from said retainer means into said pulsator chambers.

References Cited in the file of this patent

UNITED STATES PATENTS

| | | |
|---|---|---|
| 1,952,557 | Masteller | Mar. 27, 1934 |
| 2,055,182 | Schultz | Sept. 22, 1936 |
| 2,128,853 | Roen | Aug. 30, 1938 |
| 2,239,348 | Wirtanen | Apr. 22, 1941 |
| 2,254,990 | Blank | Sept. 2, 1941 |
| 2,745,252 | Reese et al. | May 15, 1956 |
| 2,746,252 | Reese | May 22, 1956 |
| 2,782,600 | Crown et al. | Feb. 26, 1957 |

FOREIGN PATENTS

| | | |
|---|---|---|
| 980,127 | France | Dec. 20, 1950 |